United States Patent [19]

Rauschenfels

[11] 4,090,882

[45] May 23, 1978

[54] GLASSY CALCIUM SILICATE FIBERS MADE FROM PHOSPHORUS SLAG

[75] Inventor: Eberhard Rauschenfels, Wiesbaden, Germany

[73] Assignee: Dyckerhoff Zementwerke Aktiengesellschaft, Wiesbaden-Amoneburg, Germany

[21] Appl. No.: 785,251

[22] Filed: Apr. 6, 1977

Related U.S. Application Data

[63] Continuation-in-part of Ser. No. 726,340, Sep. 24, 1976, abandoned, which is a continuation of Ser. No. 584,242, Jun. 5, 1975, abandoned.

[30] Foreign Application Priority Data

| Jun. 8, 1974 | Germany | 2427770 |
| Mar. 30, 1974 | Germany | 2318512 |
| Mar. 28, 1974 | Luxembourg | 69740 |
| Mar. 25, 1974 | Belgium | 142427 |
| Mar. 14, 1974 | Switzerland | 3598/74 |
| Mar. 22, 1974 | France | 74 09984 |
| Mar. 27, 1974 | Netherlands | 7404191 |

[51] Int. Cl.² .................................................. C03C 13/00
[52] U.S. Cl. .................................................. 106/99; 65/2; 106/50; 106/51; 106/104; 106/109; 106/110; 106/118; 106/120; 264/8
[58] Field of Search .................. 106/50, 51, 99, 104, 106/109, 110, 118, 120; 264/8

[56] References Cited

U.S. PATENT DOCUMENTS

| 3,062,670 | 11/1962 | Marzocchi et al. | 106/109 X |
| 3,360,592 | 12/1967 | Rau et al. | 264/8 |
| 3,360,593 | 12/1967 | Rau et al. | 264/8 |
| 3,736,162 | 5/1973 | Chvalovsky | 106/99 |
| 3,783,092 | 1/1974 | Majumdar | 106/50 X |
| 3,794,505 | 2/1974 | Helser et al. | 106/120 X |
| 3,847,627 | 11/1974 | Erickson | 106/50 |
| 3,854,986 | 12/1974 | Chvalovsky et al. | 106/50 X |
| 3,859,106 | 1/1975 | Majumdar | 106/120 |
| 3,904,423 | 9/1975 | Guthrie | 106/50 |
| 3,966,481 | 6/1976 | Atkinson et al. | 106/99 X |
| 4,002,482 | 1/1977 | Coenen | 106/99 X |

FOREIGN PATENT DOCUMENTS

| 1,447,653 | 9/1965 | France | 106/51 |
| 199,368 | 7/1967 | U.S.S.R. | 106/51 |

OTHER PUBLICATIONS

Tobol' SKII, G.F. "Technological Production & Properties of Mineral Wool from Phosphorus Slags"-Chem. Abstracts 73, 123191c.
Volf, M. B. – Technical Glasses– (1961) London, p. 425.
Ceramic Industry–Jan. 1967, Handbook of Ceramic Raw Materials, p. 129, "Phosphate Slag".

*Primary Examiner*—Helen M. McCarthy
*Attorney, Agent, or Firm*—Burgess, Dinklage & Sprung

[57] ABSTRACT

In a building material comprising an inorganic binder selected from the group consisting of Portland cement, alumina cement, calcium silicate, lime and gypsum, structurally reinforced with glass fibers, the improvement which comprises employing as said glass fibers alkali-resistant calcium silicate glass fibers spun and drawn from molten phosphorus slag, said fibers consisting essentially of approximately

| CaO | 10–60 % by weight |
| $SiO_2$ | 35–70 |
| $Al_2O_3$ | 1–10 |
| $ZnO + ZrO_2 + Cr_2O_3 + TiO_2$ | 0.1–10 |
| $Fe_2O_3$ and $Na_2O$ | <2. |

2 Claims, No Drawings

GLASSY CALCIUM SILICATE FIBERS MADE FROM PHOSPHORUS SLAG

This application is a continuation-in-part of Application Ser. No. 726,340, filed Sept. 24, 1976, which is a continuation of Application Ser. No. 584,242, filed June 5, 1975, both now abandoned.

The present invention relates to the utilization of phosphorus slag after treating it to remove materials therefrom and to add materials to adjust its composition for the required purpose.

In the electrothermal production of phosphorus from appropriate ores there results a slag which predominantly comprises CaO and $SiO_2$. There is already available a huge supply of this waste product and more is continuously being created. Obviously it would be desirable to find a use for this product.

From its major components it would appear it could be used to spin inorganic filaments which have a variety of end uses. Such filaments are produced by extrusion through platinum spinnerets but the impurities in the slag would damage the spinnerets so that such use is not practical. Moreover, the resulting filaments have limited utility because of their properties.

It is possible to treat the slag to remove much of the metallic or semi-metallic impurities, e.g. iron phosphide, and then the carbon impurities and such modified slag will no longer damage a spinneret upon extrusion but the physical properties of the resulting filaments will still be inadequate except for the least valuable applications.

It is accordingly an object of the invention to adjust the composition of phosphorus slag to predetermined values whereby it can readily be spun to produce inorganic filaments employing conventional equipment and techniques for fiber production.

It is a further object of the invention to provide such filaments of a physical form and internal and external structure as to render them especially strong and useful.

Another objective is to provide inorganic fibers which are especially suited for the production of fiber-reinforced, inorganically bonded building- and work materials. In the field of building materials these can be used in the production of reinforced cement building blocks, slabs, and the like.

These and other objects and advantages are realized in accordance with the present invention pursuant to which phosphorus slag, cleansed of most of its carbon and iron impurities and after adjustment of its composition, is spun into filaments which are predominantly calcium silicate and which are of glassy rather than crystalline structure. The filaments are low in impurities, particularly iron as well as alkaline oxide impurities such as the oxides of magnesium, sodium, potassium, and the like, and exhibit marked resistance to alkali which therefore renders them suitable for uses in alkaline environments without loss of their strength, e.g. embedded in cement structures which contain and/or release alkali. Advantageously the chemical composition of the cleansed slag falls in the range of about 44 to 50 weight % CaO, about 38 to 47 weight % $SiO_2$, about 2 to 7 weight % $Al_2O_3$ and about 2 to 4 weight % F. The content of iron and alkaline metal oxide impurities, e.g. $Na_2O$, amounts altogether at most to about 2 weight %. Some impurities such as less than about 2% of residual $P_2O_5$ may also be present. Advantageously the CaO and $SiO_2$ are present in approximately equimolar amounts.

The cleansed phosphorus slag can be remelted and than processed into glass fibers according to known processes, thus producing an essentially calcium silicate fiber of glassy structure.

The fabrication of calcium silicate filaments of glassy structure from the cleansed phosphorus slag is surprising because, as is known, it is strongly inclined to crystallize and therefore wollastonite can be produced by simple tempering of the slag.

If such glass fibers already show a substantially greater resistance to alkaline reacting, i.e. basic aqueous solutions in building materials made from inorganic binding material compared to known products, then a further increase of the alkali resistance can be obtained if certain materials are added in certain quantities to the starting mixture for the production of the calcium silicate fibers of glassy structure.

A preferred embodiment of the instant invention therefore concerns the use of calcium silicate fibers of glassy structure modified by admixed materials, which fibers are drawn from phosphorus slag, to reinforce building materials made of inorganic binding agents. The additives can be used to adjust the pH of the glass fibers in water and thus adapt them to the respective pH value of the building material environment, as described more fully hereinbelow.

Especially $TiO_2$, $Cr_2O_3$, $ZrO_2$ and ZnO alone or in admixture, as well as products containing these oxides, are suitable additives or components of the phosphorus slag. The additional quantities amount to about 0.1 to 10 preferably about 0.1 to 7 weight % relative to the starting mixture. Especially resistant in the alkaline environment of concrete are calcium silicate fibers of glassy structure containing about 2 to 5 weight % of ZnO and whose composition falls in the range of about 20 to 35 weight % of CaO, about 40 to 60 weight % of $SiO_2$, and about 1 to 10 weight % of $Al_2O_3$.

The additives are admixed with the cinder or the granulated, glassy slag sand, whereupon the mixture is melted and then glass fibers are spun and attenuated in known manner. However, one can also add the additives to the still-liquid slag subsequent to the recovery of phosphorus and then process it into glass fibers immediately or after granulation and melting. If added to the melt and the melt is directly spun, a process step is saved.

Especially suitable for use according to the present invention is phosphorus slag which is kept at about tapping temperature before the addition of the additives and floats practically completely free of the metallic phase and ferrophosphorus which impurities are present in a more dense lower layer. The slag layer is tapped separately from the lower layer.

However, the slag can also be quenched in water in known manner whereby a glassy slag sand results from which, if desired, impurities can be removed mechanically. These products can be remelted and then processed into glass fibers according to known processes. However, one can also additionally add substances containing $Al_2O_3$ and/or $SiO_2$ such as, for instance, alumina, kaolin or industrial waste products such as $SiO_2$ dust in order to decrease the influence of a temperature change on the viscosity of the glass melt, and particularly in a temperature randge which is favorable for the drawing of fibers. The addition of $TiO_2$, $Cr_2O_3$, ZnO or $ZrO_2$ discussed hereinabove takes place in the same process step as that of $Al_2O_3$ or $SiO_2$ but with a different objective, namely to increase the stability of the fiber in cement.

The calcium silicate fibers of glassy structure consist essentially of approximately 10-60% by weight CaO, 35-70% by weight $SiO_2$, 1-10% by weight $Al_2O_3$, 0.1-10% by weight of at least one modifying oxide selected from the group consisting of ZnO, $ZrO_2$, $Cr_2O_3$ and $TiO_2$, and less than 2% by weight of $Fe_2O_3$ and $Na_2O$. In a preferred composition, the content of CaO in the fiber is from about 15 to 50% by weight and the content of $SiO_2$ is from about 40 to 65% by weight. In a most preferred composition, the content of CaO in the fiber is from about 20 to 35% by weight and the content of $SiO_2$ is from about 40 to 60% by weight.

Especially preferred are glass fibers in the form of tows and endless glass fibers, glass fiber mats, rope-like constructions or sections of glass fiber bundles having a length between about 0.05 and 5.0 cm and a diameter of about 0.005 to 0.05 mm. They have a high modulus of elasticity within the range of about 4,000 to 7,000, preferably about 5,600 to 6,400kp/mm$^2$ and tensile strength of the order of magnitude of about 60 to 130 kp/mm$^2$, preferably about 80 to 130 kp/mm$^2$. X-ray diffraction analyses establish that the modified calcium silicate fibers used according to the instant invention have no crystalline phase but are completely glassy solids. The invention will be further described in the following illustrative examples wherein all parts are by weight unless otherwise expressed.

EXAMPLE 1

An electrothermal phosphorus slag is impinged with water to form fine granules predominantly <3mm. By employing a 3mm sieve the larger carbon-rich particles are mechanically removed and by subjecting the particles to a strong magnetic field ferrophosphors and other iron-rich impurities are magnetically removed. The slag particles are oxidized in a kiln supplied with air whereby the dissolved carbon is burned off, the particles thereby changing in color from a dark gray to a clean white. The particles then have the following approximate composition by weight:

| | |
|---|---|
| CaO | 49% |
| $SiO_2$ | 39.5 |
| $Al_2O_3$ | 5 |
| F | 3 |
| $P_2O_5$ | 2 |
| $Fe_2O_3$ | <0.1 |
| Alkaline metal oxides and MgO | 1 |

$SiO_2$ in the form of fine sand is added to bring the $CaO:SiO_2$ weight ratio to about 1:2 and ZnO is added to the extent of 5%. The modified slag is melted, spun through a platinum spinneret in conventional manner and thereby attenuated to form glassy filaments essentially comprising calcium silicate. The filaments average 10 μm in diameter and are circular in cross-section.

Several filaments are collected into endless strands to which the filaments are bound together by adding a binder, i.e. size. Several strands are brought together to form a roving. The endless roving is coiled into a roving package. The coiled roving is subsequently withdrawn, cut into short particles of 13 mm length and blown into a form simultaneously with a slurry of cement and water. The strands are held together only by twisting into rovings so that the rovings fall apart when chopped into short lengths. The fibers are present in about 4% by weight of the dry cement. Upon setting and drying, shaped bodies result which are strong in tension as well as compression and which retain their strength even after prolonged exposure to a humid and/or wet atmosphere.

Shaped bodies similarly produced with glass fibers of the following compositions by weight percent are particularly preferred:

| | CaO | $SiO_2$ | $Al_2O_3$ | $Fe_2O_3$ | $Na_2O$ | ZnO | $ZrO_2$ | $TiO_2$ |
|---|---|---|---|---|---|---|---|---|
| a) | 29.2 | 53.0 | 7.9 | 0.1 | 0.4 | 5.5 | 3.7 | 0.2 |
| b) | 29.2 | 57.8 | 8.6 | 0.1 | 0.4 | 0 | 3.7 | 0.2 |
| c) | 33.0 | 57.4 | 5.3 | 0.1 | 0.4 | 0 | 3.7 | 0.1 |
| d) | 29.0 | 51.8 | 8.1 | 0.1 | 1.5 | 5.5 | 3.7 | 0.2 |

EXAMPLE 2

Glass fibers were produced in accordance with Example 1 but with various amounts of different additives and aqueous extracts thereof were compared as to pH value with extracts of glass fibers not in accordance with the invention. The results, set forth in Table 1, show that the pH value of the extract varies with the particular additive. The pH values were obtained as follows: in each case 7 parts by weight of glass fibers of about the same length and diameter were shaken in plastic vessels with 10 parts by weight of doubly-distilled water and then the pH value of the fluid was determined four times within two weeks after settling of the solid material. The following pH values resulted:

TABLE 1

| Material | $SiO_2$ Content in % | CaO Content in % | pH value |
|---|---|---|---|
| a) Silica-glass fiber (prior art) | 99 | — | 7.5 |
| b) E-glass fiber (prior art) | 55 | 21 | 10.4 |
| c) Glass fiber according to invention-no additive | 60 | 25 | 10.9 |
| d) Glass fiber according to invention, with: | | | |
| I) 3% $TiO_2$ | 40 | 47 | 11.0 |
| II) 3% $Cr_2O_3$ | 40 | 47 | 11.4 |
| III) 3% $ZrO_2$ | 40 | 47 | 11.5 |
| IV) 3% ZnO | 40 | 47 | 11.7 |
| V) 1% each of $TiO_2$ + ZnO + $Cr_2O_3$ + $ZrO_2$ | 40 | 47 | 11.5 |

The pH value can of course be adjusted by the amount of additive selected in each case. With knowledge of the pH value of the calcium silicate fibers its optimal applicability can also be determined, i.e. that particular fiber is employed for a particular use whose pH value is as close as possible or equal to the pH value of the environment of the building material. Fiber d(IV) of Table 1 is especially suited for use in reinforcing building materials made from Portland cement.

EXAMPLE 3

It is known that the setting of Portland cement frees large amounts of $Ca(OH)_2$ which permanently remain in the cement. In order to ascertain the stability of fibers in accordance with the invention in an environment such as in hardened concrete, prisms of Portland cement having a dimension of 1 × 1 × 6 cm were wrapped and stored under water for 180 days at 20° C. Subsequently the free $Ca(OH)_2$ content of the prisms was chemically determined. These values were compared in each case with the value of the prisms which were produced without fibers but instead with an equal amount of material, which is not reactive with $Ca(OH)_2$, this value being taken as 100. Therefore, if the glass fibers react with the $Ca(OH)_2$ then the free $Ca(OH)_2$ content of the glass fiber-reinforced prisms must decrease. In Table 2 there are compiled the relative contents of free $Ca(OH)_2$ in different samples after 180 days.

TABLE 2

| Prisms, produced by addition of 5% of fibers | Relative content of free $Ca(OH)_2$ after 180 days |
|---|---|
| Without addition of fibers but with inactive replacement | 100 |
| Fibers without additive | 89 |
| Fibers with 3% $TiO_2$ as additive | 97 |
| 3% $ZrO_2$ additive | 100 |
| 3% $Cr_2O_3$ additive | 98 |
| 3% ZnO additive | 100 |
| 1% Each of $TiO_2$ + $ZrO_2$ + $Cr_2O_3$ + ZnO | 99 |

It is evident that the fibers without additive reacted more strongly than the fibers with additive. It is also evident that the calcium silicate fibers used according to the invention have different reaction values according to the additive and the amount added. The results also show that the use of a calcium silicate fiber of glassy structure containing ZnO as additive is especially suitable for the reinforcement of concrete.

The modified calcium silicate fibers of glassy structure are also suitable for the reinforcement of concrete based on alumina cement and Portland cement. Even if the concrete does not have steel reinforcement, the novel fibers increase the tensile strength of concrete as well as its rigidity and impact strength and its resistance to chipping off at high temperature stress. The reinforcement of the concrete with glass fibers can be advantageously combined with that by steel inserts.

The modified calcium silicate fiber of glassy structure is furthermore suitable for the production of other cement based building materials, especially those heretofore reinforced with asbestos fibers such as patent plasters, finished mortars and plasters, as well as plates, corrugated plates, pressure tubes, flower boxes, gutters, roof gutter pipes and other products identified as asbestos cement articles. For such uses the building materials will generally range in thickness from about 3-40 mm and the reinforcing fibers will range in diameter from about 5-50 μ, preferably about 10-25 μ. The amount of fiber depends upon the desired end properties but about 3-5% by weight of dry object is generally quite satisfactory.

In addition, the use of the modified calcium silicate fiber is possible in building materials based on other inorganic binding agents such as, for instance, building lime and gypsum and in building materials based on organic binding agents. It can also be used as a filler for plastics.

Another interesting field of application is in hydrothermally hardened concretes. Here the modified glass fibers also serve as aggregate for the reinforcement of concrete. They react in the autoclave process only imperceptibly with the basic solution and therefore remain almost unchanged in their shape stability. Especially advantageous in this connection is their light color so that the calcium silicate concretes are not only reinforced in their strength but also keep their light or white color tone.

In addition it is possible to produce and use economically other especially laminar glass fiber cement articles which did not give satisfactory results with asbestos fibers because of unsuitable E-moduli and/or impact strength.

It will be appreciated that the instant specification and claims are set forth by way of illustration and not limitation, and that various modifications and changes may be made without departing from the spirit and scope of the present invention.

What is claimed is:

1. In the production of phosphorus wherein a phosphorus-containing material is electrothermally processed to produce phosphorus and a molten slag, the phosphorus is separated and the molten slag is solidified, the improvement which comprises adjusting the $SiO_2$ content and adding to the separated slag at least one modifying oxide selected from the group consisting of ZnO, $ZrO_2$, $Cr_2O_3$ and $TiO_2$ to form a molten mass having the approximate composition

| | |
|---|---|
| CaO | [10–60] 20–35 by weight |
| $SiO_2$ | [35–70] 40–60 |
| $Al_2O_3$ | 1–10 |
| $ZnO+ZrO_2+Cr_2O_3+TiO_2$ | 0.1–10 |
| oxide impurities, | <2, |
| $Fe_2O_3$ and $Na_2O$ | | the weight ratio for CaO: $SiO_2$ being about 1:2, and solidifying said mass by melt spinning and attenuating to form calcium silicate glass fibers.

2. The process of claim 1, wherein

| | |
|---|---|
| CaO | 15–50% by weight |
| $SiO_2$ | 40–65 |
| $Al_2O_3$ | 1–10] |
| $ZnO+ZrO_2+Cr_2O_3+TiO_2 =$ | 0.5–7 and |
| oxide impurities = | <1 | and an aqueous slurry of an inorganic binder selected from the group consisting of Portland cement, alumina cement, calcium silicate, lime and gypsum is cast about said fibers as a reinforcement to form a building material.

* * * * *